US011153189B2

(12) United States Patent
Oswald et al.

(10) Patent No.: US 11,153,189 B2
(45) Date of Patent: Oct. 19, 2021

(54) GROUPING NETWORK TRAFFIC PRIOR TO STORAGE IN A COLUMNAR DATABASE

(71) Applicant: Arbor Networks, Inc., Westford, MA (US)

(72) Inventors: Kyle Oswald, Ann Arbor, MI (US); Mike Ratanatharathorn, Whitmore Lake, MI (US); Michael Vanderlaar, Ann Arbor, MI (US); Scott Cameron, Chicago, IL (US); Andrew Curtin, Ypsilanti, MI (US); George Klinich, III, Ann Arbor, MI (US)

(73) Assignee: Arbor Networks, Inc., Westford, MA (US)

( * ) Notice: Subject to any disclaimer, the term of this patent is extended or adjusted under 35 U.S.C. 154(b) by 0 days.

(21) Appl. No.: 15/931,228

(22) Filed: May 13, 2020

(65) Prior Publication Data

US 2021/0135968 A1 May 6, 2021

Related U.S. Application Data

(60) Provisional application No. 62/930,386, filed on Nov. 4, 2019.

(51) Int. Cl.
*H04L 12/26* (2006.01)
*G06F 16/27* (2019.01)
(Continued)

(52) U.S. Cl.
CPC ........ *H04L 43/0876* (2013.01); *G06F 16/221* (2019.01); *G06F 16/24573* (2019.01);
(Continued)

(58) Field of Classification Search
CPC . H04L 43/0876; H04L 43/0817; H04L 45/44; G06F 16/221; G06F 16/278; G06F 16/24573
See application file for complete search history.

(56) References Cited

U.S. PATENT DOCUMENTS 8,676,729 B1 * 3/2014 Keralapura ......... H04L 63/1416
706/12
9,336,263 B2 * 5/2016 Abadi ................. G06F 16/2386
(Continued)

*Primary Examiner* — Patrice L Winder
(74) *Attorney, Agent, or Firm* — Locke Lord LLP; Scott D. Wofsy; Christopher J. Capelli

(57) ABSTRACT

A computer-implemented method of grouping network traffic metadata includes, based on a selected dimension of the network traffic metadata received from a network router, obtaining a statistic about a flow of network traffic metadata received over an interval for each instance of multiple instances of the dimension. The method further includes distributing the network traffic metadata into a plurality of groups for network traffic metadata from the smallest possible number of instances of the selected dimension to be distributed to each group, with the flow of network traffic metadata distributed optimally for a criteria regarding the statistic amongst the plurality of groups for minimizing cardinality of each group of the plurality of groups with respect to unselected dimensions of the network traffic metadata and providing each group to a columnar database for storage of the network traffic metadata distributed into each group in a different partition of the columnar database.

18 Claims, 7 Drawing Sheets

(51) Int. Cl.
*G06F 16/22* (2019.01)
*G06F 16/2457* (2019.01)
*H04L 12/721* (2013.01)

(52) U.S. Cl.
CPC ........ *G06F 16/278* (2019.01); *H04L 43/0817* (2013.01); *H04L 45/44* (2013.01)

(56) References Cited

U.S. PATENT DOCUMENTS

| | | | |
|---|---|---|---|
| 9,342,544 B2* | 5/2016 | Chen | G06F 16/24561 |
| 10,135,711 B2* | 11/2018 | Zak | H04L 43/028 |
| 10,334,085 B2* | 6/2019 | Hsiao | H04L 43/028 |
| 10,432,484 B2* | 10/2019 | Hughes | G06F 16/248 |
| 10,713,247 B2* | 7/2020 | Petropoulos | G06F 16/24542 |
| 2011/0125749 A1* | 5/2011 | Wood | H04L 43/028 |
| | | | 707/737 |
| 2015/0295807 A1* | 10/2015 | Huang | G06F 16/901 |
| | | | 709/224 |
| 2017/0237640 A1* | 8/2017 | Stocker | H04L 43/04 |
| | | | 709/224 |
| 2018/0067937 A1* | 3/2018 | Bauman | G06F 16/148 |

* cited by examiner

400

402
Provide a list of the routers (R) and a number of groups (N), the list having the amount (C) of network traffic metadata received from each router (r) over the last previous time interval, each router having one chunk of network traffic metadata

404
Determine an Ideal Weight (IW) as a function of a sum of C received from all of the routers (R) and a number of groups (N) (N = to the number of data partitions of the columnar database)

405
Split each router into c equally sized chunks, wherein c is a function of each router's C (denoted C_r) and IW

406
Split the router r having the largest size chunk(s) into c_r + 1 equally sized chunks, wherein c_r is the current number of chunks for router r

408 At least N total chunks? No → (back to 406) Yes → Ⓐ

*Fig. 4*

GROUPING NETWORK TRAFFIC PRIOR TO STORAGE IN A COLUMNAR DATABASE

CROSS REFERENCE TO RELATED APPLICATIONS

This application claims priority to U.S. Patent Application Ser. No. 62/930,386 filed Nov. 4, 2019, which is incorporated herein by reference in its entirety.

BACKGROUND OF THE INVENTION

1. Field of the Invention

The present disclosure relates to network traffic analysis, and more particularly, to grouping network traffic prior to storage in a columnar database.

2. Description of Related Art

When storing network traffic metadata, a random distribution of network traffic metadata records into multiple database partitions can result in a sub-optimal distribution of cardinality with respect to different dimensions of the network traffic metadata.

The network traffic metadata can be processed (e.g., annotated) and stored, or just stored. When this metadata is randomly partitioned and stored, the metadata stored in each partition can have relatively high cardinality with respect to the different dimensions of the network traffic metadata, similar to the random sample.

The metadata that is stored in the partitions can be processed, such as by receiving queries about the metadata analysis. The relatively high cardinality can cause inefficiency when responding to queries and analyzing the metadata.

While conventional methods and systems have generally been considered satisfactory for their intended purpose, there is still a need in the art for reliable network monitoring systems and methods that can reduce cardinality of metadata stored in the partitions, such as to improve efficiency of processing queries and/or analyzing the stored metadata.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a computer-implemented method of grouping network traffic metadata. The method includes, based on a selected dimension of the network traffic metadata received from at least one network router, obtaining a statistic about a flow of network traffic metadata received over an interval for each instance of multiple instances of the dimension. The method further includes distributing the network traffic metadata into a plurality of groups for network traffic metadata from the smallest possible number of instances of the selected dimension to be distributed to each group, with the flow of network traffic metadata distributed optimally for a criteria regarding the statistic amongst the plurality of groups for minimizing cardinality of each group of the plurality of groups with respect to unselected dimensions of the network traffic metadata. The method further includes providing each group to a columnar database for storage of the network traffic metadata distributed into each group in a different partition of the columnar database.

In one or more embodiments, the network traffic metadata can be annotated before distributing into the determined number of groups.

In one or more embodiments, providing each group to the columnar database can include providing the network traffic metadata flowing in real time to a forwarding component that provides each group to the columnar database.

In one or more embodiments, the selected dimension can be a particular router that outputs the network traffic metadata.

In one or more embodiments, an amount of routers of the plurality of routers from which the network traffic metadata can be received is flexible and an amount of the partitions to which the groups are provided can be flexible.

In one or more embodiments, network traffic metadata from one instance of the selected dimension can be distributed into at least two groups of the plurality of groups, and the method can further include, for the instance of the selected dimension, based on a second selected dimension of the network traffic metadata received from at least one network router, obtaining a second statistic about flow of network traffic metadata received over the interval for each instance of the second selected dimension that occurred with the instance of the selected dimension. Furthermore, the method can include distributing the network traffic metadata into the plurality of groups for network traffic metadata from the smallest possible number of instances of the second selected dimension to be distributed to each of the at least two groups, with the flow of network traffic metadata distributed optimally for a criteria regarding the statistic amongst the at least two groups for minimizing cardinality of each group of the at least two groups with respect to unselected dimensions of the network traffic metadata.

In one or more embodiments, distributing the network traffic metadata can be repeated at regular intervals and/or in response to an event or a condition.

In one or more embodiments, the criteria for optimally distributing the network traffic metadata over the at least two groups can maximize uniformity of an amount of network traffic metadata this is distributed to the at least two groups.

In one or more embodiments, the method can further include obtaining the statistic about a flow of network traffic metadata for each instance of the selected dimension over a property range, determining an ideal weight as a function of a sum of the statistic about flow of network traffic metadata for all of the instances of the selected dimension and a number of groups included in the plurality of groups, splitting each router is into equally sized chunks, wherein the number of chunks is a function of the statistic for the router and the ideal weight, iteratively repeating until a total number of chunks for all of the instances of the selected dimension exceeds the number of groups, and splitting the router having the largest size chunk or chunks into its current number of chunks incremented by one.

In one or more embodiments, the method can further include sorting the instance of the selected dimension into an ascending or descending order as a function of the statistic about flow of network traffic metadata for the instance of the selected dimension divided by the number of chunks into which it was split, iteratively repeating processing each of the instances of the selected dimension in the order of the sorting, iteratively repeating for each chunk of the instance of the selected dimension being processed, and assigning a chunk of the instance of the selected dimension being processed to a group of the plurality of groups that has a least statistic about flow of network traffic metadata already assigned and does not already contain a chunk from the instance of the selected dimension being processed.

In accordance with other aspects of the disclosure, the computer-implemented method of grouping the network traffic metadata further includes receiving network traffic metadata from a plurality of network routers. The statistic obtained about the flow of network traffic metadata is received for a property range per router of the plurality of routers.

In accordance with other aspects of the disclosure, a system of grouping network traffic metadata is provided. The system includes a memory configured to store a plurality of programmable instructions and at least one processing device in communication with the memory. The at least one processing device, upon execution of the plurality of programmable instructions, is configures to perform the disclosed computer-implemented method.

These and other features of the systems and methods of the subject disclosure will become more readily apparent to those skilled in the art from the following detailed description of the embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 4 is a flowchart of an example method for splitting network traffic metadata into appropriate chunks, in accordance with embodiments of the disclosure;

DETAILED DESCRIPTION OF THE PREFERRED EMBODIMENTS

Figure 1:
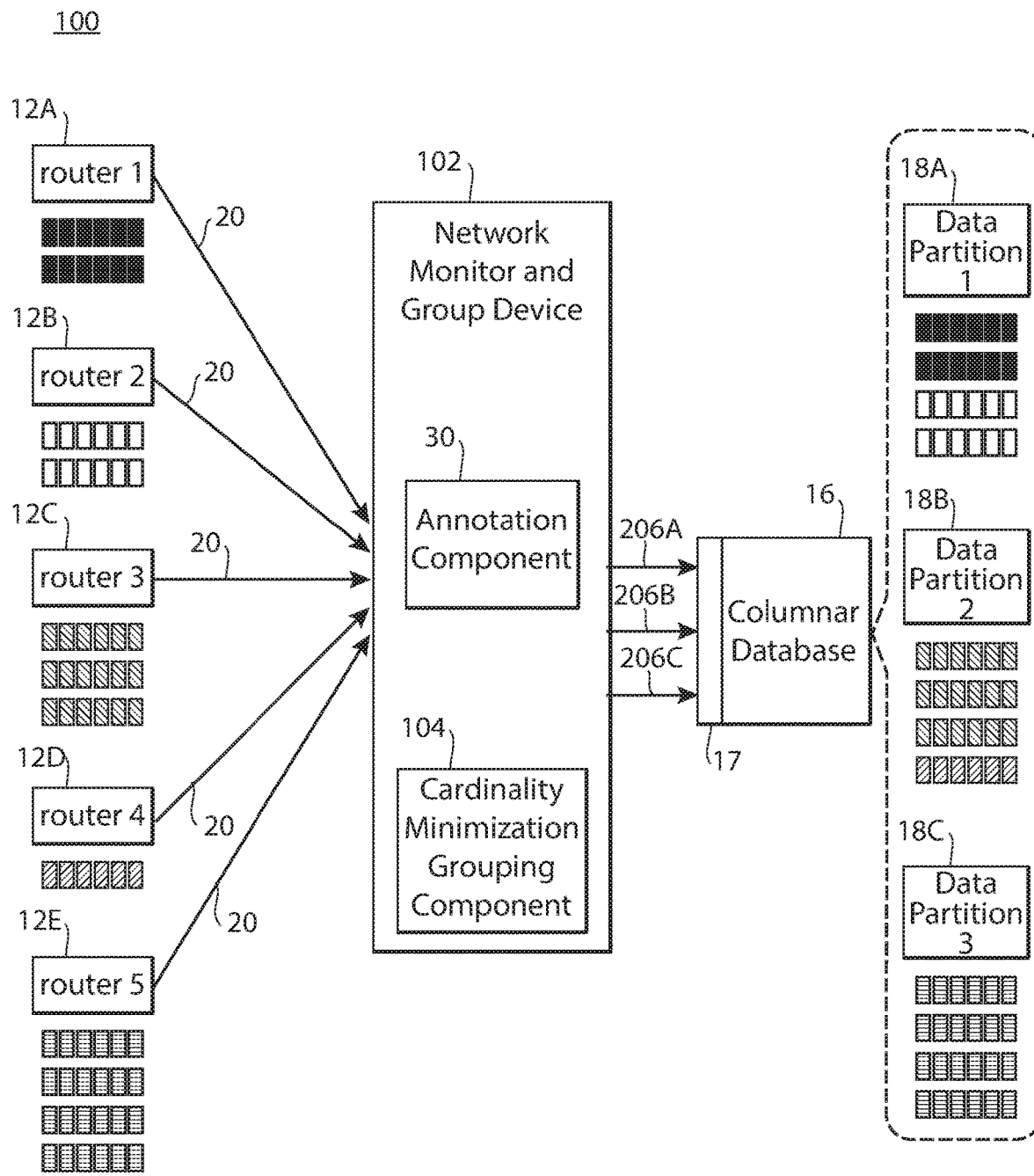
FIG. 1 is a system block diagram of an example network monitor system receiving network traffic metadata from routers of the network in accordance with embodiments of the disclosure.

In accordance with the disclosure below, a network monitor system receives network traffic metadata and groups the data according to a selected dimension of the network traffic metadata for the purposes of minimizing cardinality of the groups with respect to unselected dimensions included in the traffic metadata. The selected dimension can identify a router that provided the network traffic metadata. Once grouped, the network traffic metadata is directed to a columnar database for storage in partitions based on the groupings. The minimal cardinality of the data stored in each partition can improve performance characteristics of the columnar database. The groupings can be repeated, such as at regular intervals, such as time intervals, or in response to an event or a condition.

The term cardinality as used throughout the disclosure in the context of databases refers to uniqueness of data values. 'High' cardinality implies that a set contains a large number of unique values, whereas 'low' cardinality implies that a set contains a small number of unique values with those values being repeated. In a set of numbers such as [1, 2, 3, 5, 8, 13, 21], since every value in the set is unique, this set has high cardinality. In a set of numbers such as [1, 1, 3, 3, 5, 5, 5] however, while there is the same number of elements, there are fewer unique values, making this an example of a low cardinality set.

The term autonomous system (AS) as used throughout the disclosure refers to a collection of IP addresses under the control of a single administrative entity. Examples include an internet service provider, such as AT&T™ or Verizon™, or a private enterprise, such as a university, large corporation, or government.

The term border gateway protocol (BGP) as used throughout the disclosure refers to a data exchange format used to communicate routing information between autonomous systems. This is used by an AS to understand how to direct network traffic between other ASs. A plain English example of a piece of information that might be exchanged via BGP could be the following: "When you need to direct traffic to IP address 25.10.100.10 (which is managed by T-Mobile), send that traffic through Time Warner to T-Mobile."

The term network topology as used throughout the disclosure refers to an arrangement of routers in a network. This may be presented as a graph that displays the connections between each router both internally and to routers of external entities such as another AS.

The term router as used throughout the disclosure refers to a network device through which network traffic passes, and that reports summarized network traffic data, referred to as network traffic metadata, to a network monitor device.

The term network traffic metadata as used throughout the disclosure refers to information about network traffic such as its source and destination, but not the actual traffic data itself. This information is summarized before being sent from a router to a network device that annotates and/or groups the network traffic metadata.

The term annotation as used throughout the disclosure refers to a process of adding additional metadata to network traffic metadata.

The term columnar database as used throughout the disclosure refers to a database that store data by column, rather than by row. Relational databases store data by row.

The term data partition as used throughout the disclosure refers to a subset of a larger pool of data, divided by a criterion, which is typically referred to as a partition key.

Reference will now be made to the drawings wherein like reference numerals identify similar structural features or aspects of the subject disclosure. For purposes of explanation and illustration, and not limitation, a block diagram of an exemplary embodiment of a network monitoring system in accordance with the disclosure is shown in FIG. 1 and is designated generally by reference character 100. Methods associated with partitioning operations of the network monitoring system 100 in accordance with the disclosure, or aspects thereof, are provided in FIGS. 2-6, as will be described. The systems and methods described herein can be used to provide improved partitioning of metadata associated with network traffic data for storage, which can improve efficiency of responding to queries about the stored metadata and analyzing the stored metadata.

Network monitor system 100 is configured to receive, annotate, and group network traffic metadata received from one or more routers and store the grouped network traffic for further analysis. The network monitor system 100 includes a network monitor and group device 102 (also referred to as monitor device 102) and a columnar database 16. The monitor device 102 receives network traffic metadata via data paths 20 from a plurality of routers 12 (shown as including routers 12A-12E). The number of routers 12 can be arbitrary, and is not limited to a specific number of routers 12. Examples of dimensions of the network traffic metadata sent from the routers 12 to the monitor device 102 can include identification of the router 12, a source IP address, a destination IP address, a source port, a destination port, and a protocol employed. The dimensions can vary depending on the router design.

The monitor device 102 optionally includes an example annotation component 30 and a cardinality minimization grouping component 104 (also referred to as grouping component 104). The annotation component 30 can further process the network traffic metadata, such as by annotating the network traffic metadata, e.g., by adding additional metadata. An example of information that is added during annotation is a city and country that the network traffic is coming from and/or going to, which can be derived from the IP addresses. The monitor device 102 optionally can include other components to further process the network traffic metadata prior to or following the grouping component 104 operating on the network traffic metadata.

The grouping component 104 distributes the network traffic metadata into a plurality of groups by tracking a flow of network traffic metadata associated with each instance of the selected dimension during an interval (e.g., time interval), determining a statistic (for example, and without limitation, average, cumulative, maximum, minimum) about the flow. Tracking the flow can include tracking, for example, throughput of a router (e.g., measured as bits per second or packets per second), a measure of unique IP addresses seen over an interval, frequency of BGP updates. The grouping component 104 can be further configured to build a map of network traffic metadata associated with each value of the selected dimension to groups as a function of results of the tracking. This map allows the network traffic metadata included in each group to include network traffic metadata associated the fewest number of values of the selected dimension to the greatest degree possible. In accordance with the map, the distribution is performed in order that network traffic metadata associated with the smallest possible number of values of the selected dimension of the network traffic metadata is distributed to each group.

The map can be updated at regular intervals (e.g., time intervals, such as every 15 minutes) or in response to a condition or event (e.g., a request). When updating the map, this can be performed using the statistic about flow of network traffic metadata tracked during the previous interval. In this way, the network traffic metadata does not need to be first collected and evaluated, and the map can be updated in real time as the network traffic metadata is streamed from the routers 12.

The selected dimension is selected based on high correlation of the unselected dimension for each value of the selected dimension. In this way, the flow of network traffic metadata is distributed optimally for one or more criteria regarding a statistic of the flow amongst the plurality of groups for minimizing cardinality of each group of the plurality of groups with respect to unselected dimensions of the network traffic metadata. A non-limiting example of such criteria include maximizing evenness of a statistic of flow of network traffic metadata distributed to the respective groups.

Another non-limiting example of a criterion is the number of distinct values per dimension upon which partitioning is not performed, given each value of the partitioning dimension.

EXAMPLES

Partitioning on Dimension A
Values for dimension A are [a, b, c]
Given A=a, dimension B has 6 possible values
Given A=b, dimension B has 4 possible values
Given A=c, dimension B has 2 possible values
Given two partitions, the result would be one partition for dimension A (having six values) and one partition for dimensions B and C combined, having (4+2=6 values).
This could be extended to another example as follows:
Partitioning on Dimension A
Values for dimension A are [a, b, c]
Given A=a, dimension B has 6 possible values, dimension C has 2 possible values
Given A=b, dimension B has 4 possible values, dimension C has 1 possible value
Given A=c, dimension B has 2 possible values, dimension C has 1 possible value
The criterion is f(a) which is some function of 6 and 2. An example of a simple function is "sum," which would result in the result 8.

The distribution of the network traffic metadata into the groups can be performed for any number of groups. This distribution can be performed in real time while the network traffic metadata is being streamed from the routers 12. The monitor device 102 can provide the network traffic metadata assigned to each group via respective streams 206 (shown as streams 206A-206C) to the columnar database 16. Each of the streams 206 can correspond to one of the groups in a one-to-one correspondence.

The columnar database 16 receives each of the streams 206, and network traffic metadata received by each stream 206 is stored in a different data partition 18 of the columnar database 16. The columnar database 16 can have any number of data partitions 18. The number of groups can be configured to be the same as the number of data partitions.

The low cardinality of the streams 206A, 206B, 206C minimizes cardinality of data stored in each partition 18. The low cardinality of the data stored in partitions 18 increases the density of the data that can be stored by the columnar database 16 and increases efficiency and speed at which the stored data can be queried.

In the one or more embodiments in which the selected dimension identifies a router 12. The grouping component 104 determines an amount of traffic received from each router 12 during a time interval. At the end of the time interval, the network traffic metadata from each router 112 is distributed to appropriate groups. Each group is provided via a respective stream 206 to the columnar database 16. Each stream 206 provides its data to a respective data partition 18 (shown as individual data partitions 18A-18C) for storage in the columnar database 16, such as for long term analysis. The columnar database 16 can include a streaming platform 17 that interfaces with the monitor device 102 to receive the streams 206. The columnar database 16 can store the received streams in its data partitions 18, receive queries about the stored data, and respond to the queries.

In one or more embodiments as depicted in FIGS. 1 and 2, the selected dimension identifies the routers 12. An evaluation is performed to determine a statistic about flow of traffic that was recently received from each router 12. A result of the evaluation is used to build a map of the respective routers 12A-12E to the respective streams 206A, 206B, 206C. This map groups the network traffic metadata so that, to the greatest degree possible, each group and data stream 206A, 206B, 206C includes network traffic metadata received from a minimal number of routers 12.

Based on the map, network traffic metadata received from routers 12 is distributed to first, second, and third respective groups which are provided to the columnar database 16 via respective streams 206A, 206B, 206C. By ensuring that each group includes data from the smallest possible number of routers 12, cardinality of the data in each group is minimized. This low cardinality is due to other dimensions of the network traffic metadata received from each router having a high correlation, such as due to being indirectly derived or in some way a consequence of the router 12 from which it was received.

The selected dimension is not limited to identification of the router, and other dimensions can be used as the selected dimension. Experimental data has been used to form a correlation matrix of different dimensions of the network traffic metadata for the purpose of identifying a dimension to select that correlates strongly with the largest number of other (nonselected) dimensions. The correlation matrix did not include IP address dimensions and Source_Route_Prefix due to high cardinalities that interfered with calculation of a correlation value, which also made these dimensions poor candidates to be the selected dimension. Based on the correlation matrix, it was determined that the most correlated dimensions fall into two categories: either being derived from BGP information (e.g., Destination Route_Prefix, Destination_Next_Hop_Address, Destination_ASPath), or identifying the router (e.g., Router_Identifier, Router Output_Interface_Identifier, Ingress Interface). In an example implementation, Router_Identifier, which is a unique identifier for the routers 12, was assigned to be the selected.

Using identification of the routers as the selected dimension can have certain operational advantages. As network monitor 102 is positioned sits between routers 12 and columnary database 16, it is not necessary to collect the network traffic metadata, and then determine the distribution, which would require processing the network traffic metadata twice, adding to overhead costs. Additionally, many of the unselected dimensions and dimensions of annotated data added to the network traffic metadata are intrinsically correlated with the originating router, which improves minimization of cardinality of the streams 206 and the data stored in data partitions 18.

Examples of intrinsically correlated dimensions of the network traffic metadata and the annotated data include identification of an interface through which the traffic is (since it is a physical entity on the router), originating AS, route prefix, city, country, and destination or source IP address, as these are tied to the network topology. This intrinsic correlation holds true in almost any modern network that would have a network monitoring system. The intrinsic correlation of IP addresses associated with one router is illustrated based on experimentation in which it was determined that a random sample of 10% of overall network traffic metadata sampled over a time interval captured 37% of IP address values of the total network traffic metadata, which results in a relatively large cardinality for that sample with respect to IP addresses. On the other hand, it was determined that the network traffic metadata output by a single router, which accounted for 10% of the total network traffic metadata, included between 3%-27% of all IP address values included in the total network traffic metadata, which resulted in a lower cardinality.

It follows that there are other dimensions besides the originating router which are associated with low cardinality of the remaining dimensions and could be good candidates as selected dimensions, such as identification of the source or destination AS, route prefix, city, country, and interface (either of the originating router or at a point of entering or exiting the network.

Figure 2A:
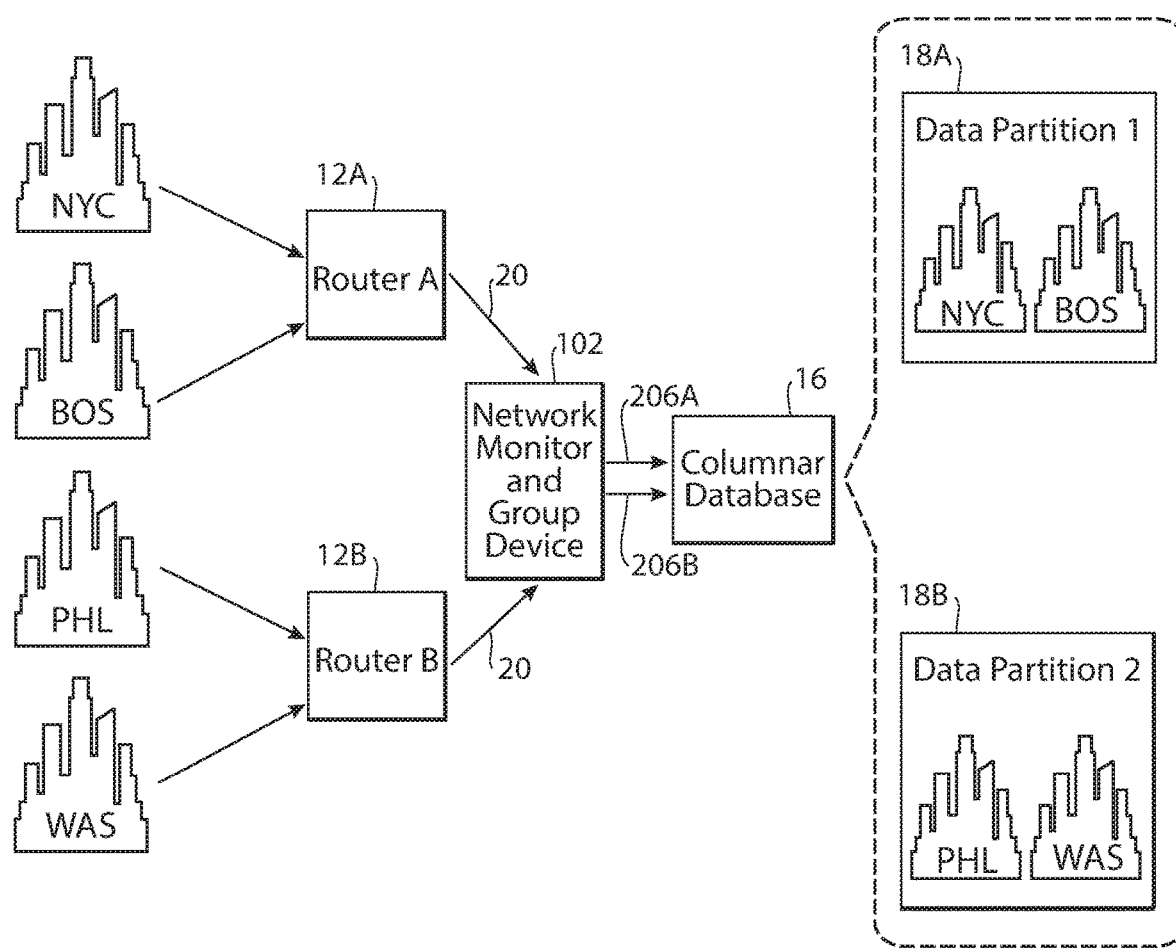
FIG. 2A is a schematic diagram of an example scenario handled by the network monitor system shown in FIG. 1, in accordance with embodiments of the disclosure.

With reference to FIG. 2A, an example scenario is shown in which network traffic from New York City (NYC) and Boston (BOS) is received by router 12A and corresponding network traffic metadata is provided to monitor device 102. Network traffic from Philadelphia (PHL) and Washington D.C. (WAS) is received by router 12B and corresponding network traffic metadata is provided to monitor device 102. Monitor device 102 groups the network traffic metadata into two groups using identification of the routers 12A, 12B as the selected dimension. The two groups are distributed to the columnar database 16 via respective streams 206A and 206B. As a result, all of the network traffic metadata from router 12A is stored in data partition 18A, and all of the network traffic metadata from router 12B is stored in data partition 18B. This results in each respective data partition 18A and 18B storing only two unique values for the city dimension, which can result in more compact storage and more efficient processing of queries with shorter query times (meaning the time to respond to a query) than ungrouped network traffic metadata.

Figure 2B:
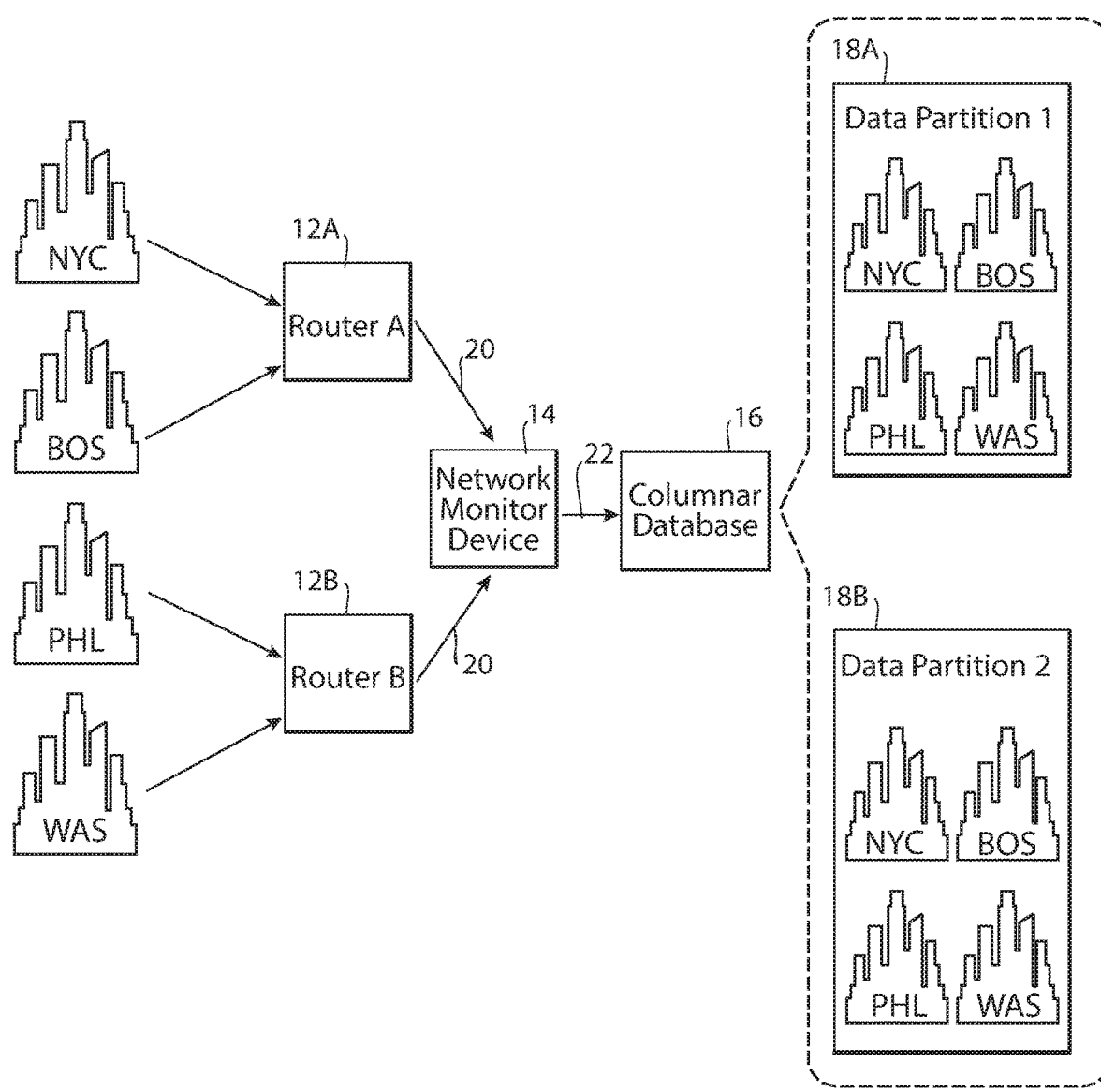
FIG. 2B is a schematic diagram of the example scenario shown in FIG. 2A handled by an example network monitor system that does not provide grouping of the network traffic metadata prior to storage.

In contrast, as shown in FIG. 2B, a monitor device 14 is used that does not include a grouping component 104. All of the network traffic metadata is sent in a single stream 22 to the columnar database 18 and then stored in data partitions 18A, 18B, such as by simply rotating which data partition 18A, 18B to which the network traffic metadata is written for even loading. Due to the lack of grouping, each of partitions 18A and 18B store network traffic metadata having city dimensions with four unique values. In this case, 50% of the network traffic metadata from router 12A and 50% of the network traffic metadata from router 12B is written to the first data partition 18A. Similarly, 50% of the network traffic metadata from router 12A and 50% of the network traffic metadata from router 12B is written to the second data partition 18B. Thus, the data partitions 18A and 18B have a higher cardinality in FIG. 2B than in FIG. 2A with respect to the city dimension, which can reduce storage compactness and cause processing of queries to be less efficient and take longer query times.

In one or more embodiments, two or more selected dimensions can be combined for grouping the network traffic metadata. In scenarios, there may be fewer routers 12 sending network traffic metadata than there are data partitions 18 to which the network traffic metadata shall be distributed. This can result in a subset of routers 12 being assigned to multiple groups and their network traffic metadata being distributed in multiple data partitions 18.

Figure 3:
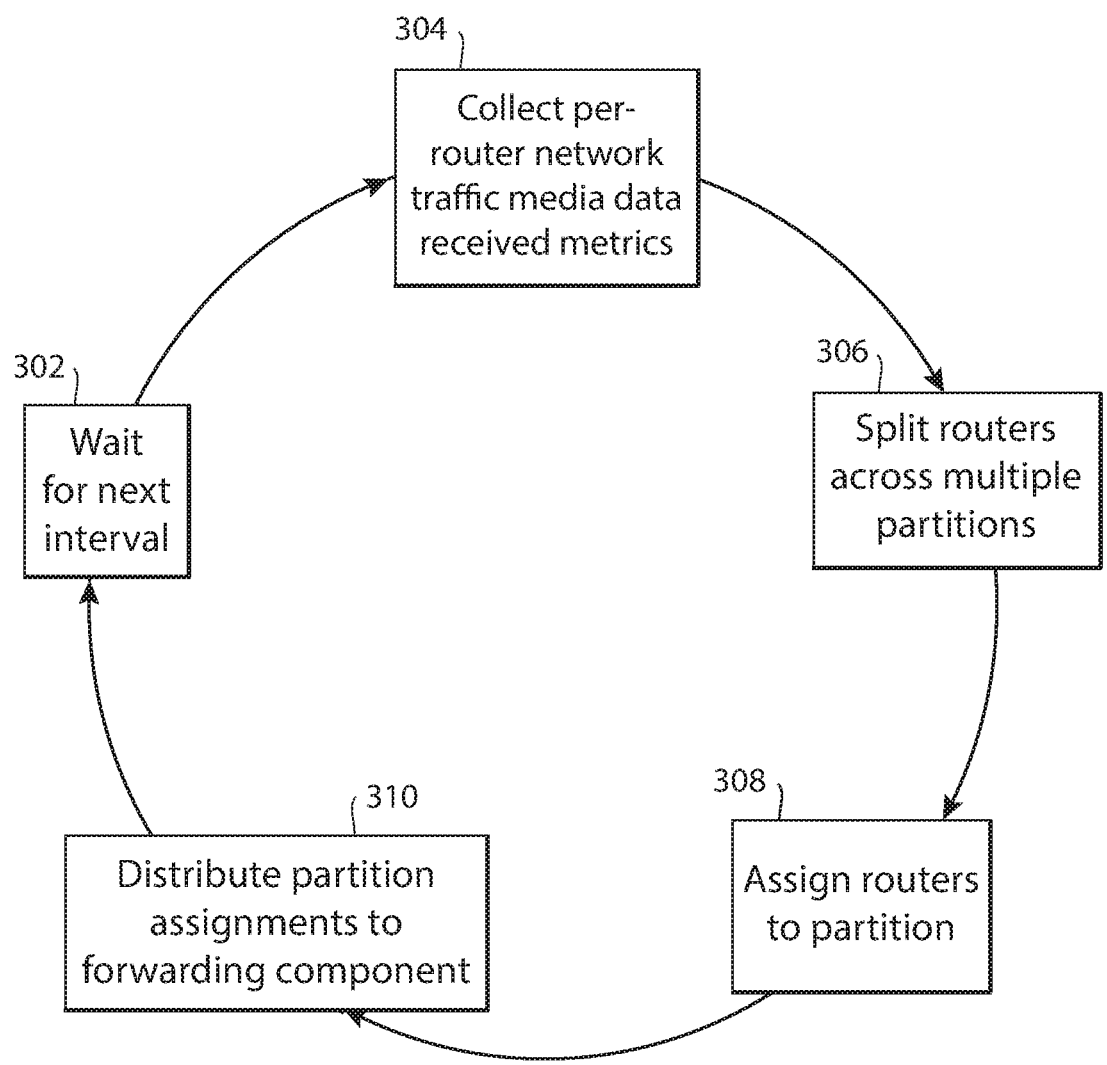
FIG. 3 is flow diagram of an example method performed by the monitor device of the network monitor system shown in FIG. 1, in accordance with embodiments of the disclosure.
Figure 5:
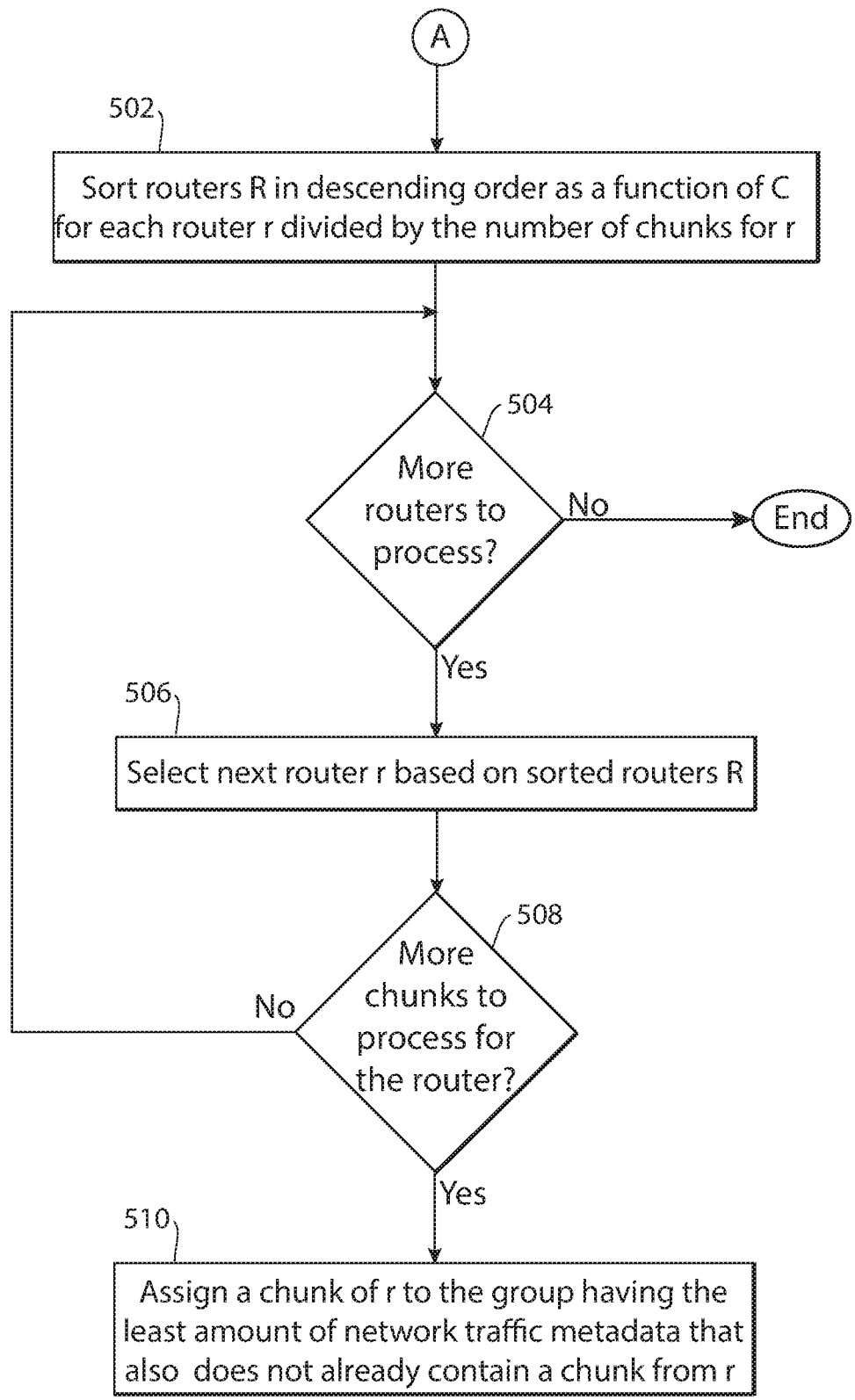
FIG. 5 is a is a flowchart of an example method for assigning network traffic metadata to data partitions, in accordance with embodiments of the disclosure.

With reference now to FIGS. 3-5, shown are flow diagrams and flowcharts demonstrating implementation of the various exemplary embodiments for grouping network traffic metadata before storing in data partitions. It is noted that the order of blocks shown in FIGS. 3-5 is not required, so in principle, certain of the various blocks may be performed out of the illustrated order or in parallel. Also, certain blocks may be skipped, different blocks may be added or substituted, or selected blocks or groups of clocks may be performed in a separate application following the embodiments described herein.

With reference to FIG. 3, a flow diagram 300 of a method performed by a monitor device of a network, such as monitor device 102 is shown. The monitor device 102 receives network traffic metadata from routers of a network over time during operation of the network. At block 302, the monitor device waits for a next time interval, indicating that the method shown in flow diagram 300 is repeated at successive time intervals, such as every 15 minutes. This interval can be determined based on shard granularity in a columnar database, such as columnar database 16.

In one or more embodiments, the interval can be a property range for a property other than time. Accordingly, the network traffic metadata can be grouped according to a statistic about flow of network traffic metadata relative to an interval, such as a time interval.

At block 304, metrics are determined about the statistic about flow of network traffic metadata provided per-router. For example, a counter can be associated with each router and incremented to indicate a number of records of network traffic metadata received from that router. For example, at block 302 the counter can be reset to zero at the start of each new interval. At block 306, the network traffic metadata for the respective routers is split into chunks, which is explained with an example method shown in FIG. 4. At block 308, each routers' chunks are assigned to a group, which is explained in with an example method shown in FIG. 6. At block 310, each group is provided to the columnar database for distribution, e.g., by a forwarding component, to a one of the columnar database's data partitions, e.g., in a one-to-one correspondence.

While FIG. 4 and FIG. 5 describe a method for distributing the network traffic metadata received at successive time intervals in order to optimize an even distribution of the network traffic metadata across the groups, the network traffic metadata can be captured based on property ranges other than time intervals, and the distribution can be optimized for one or more different criteria other than evenness.

With reference to FIG. 4, a flowchart is shown for performing block 306 of FIG. 3, namely splitting the network traffic metadata received from each router into chunks as appropriate. At block 402, a list of all of the routers (R) and a number of groups (N) is received (e.g., from block 304 of FIG. 3). The number of groups N is equal to the number of data partitions of the columnar database. The list includes a statistic (C) about flow of network traffic metadata received from each router (r) over the last previous time interval. Before any splits have occurred, each router is determined to have one chunk that includes all of its network traffic metadata. C can be, for example and without limitation, an average, total, maximum, or minimum flow of records of the network traffic metadata.

At block 404, an ideal weight (IW) is determined as a function of a sum of C received from all of the routers (R) and the number of groups (N). In one or more embodiments, IW is determined using the example Equation (1):

$$IW = (\text{total } C \text{ for all } R)/N \quad (1)$$

At block 405, each router is split into c equally sized chunks, wherein c is a function of each router's C (denoted C_r) and IW. For example, number of chunks c for a router r can be determined using the example Equation (2):

$$c = \text{Floor}(C/IW) \quad (2)$$

At block 406, router r having the largest size chunk(s) is split into c_r+1 equally sized chunks, wherein c_r is the current number of chunks for router r.

At block 408, a determination is made whether there at least N chunks. If the determination is that there are not yet N chunks, the method continues at block 406. If the determination is that there are at least N chunks, the method continues at block 602 of FIG. 6.

Examples A and B below show example scenarios using the disclosed methods. The methods do not limit the disclosure to a particular number of routers from which the network traffic metadata is received, or a particular number of groups (such as chunks or partitions) to which the network traffic metadata is distributed. In scenarios, there can be a larger quantity of the selected dimension than groups, whereas in other scenarios there can be the quantity of the groups can be larger than the quantity of the selected dimension. Whereas Examples A and B are directed to identification of routers being the selected dimension, the disclosure is not limited to these examples, and the selected dimension can be a different dimension than identification of a router.

Example A

Input: Routers R include routers A, B, and C having the respective C's: [200, 300, 500]

$N=5$

At block 404 IW is determined using Equation (1). Total C for all R=200+300+2*(250)=1000

$IW=1000/5=200$

Iteration 1: After a first iteration of blocks 406 and 408:
Router A has chunk 200, router B has chunk 300, and router C has chunks 250, 250.

Iteration 2: After a second iteration of blocks 406 and 408:
Router A has chunk 200, router B has chunks 150, 150, and router C has chunks 250, 250, at which point there are N chunks, and the method continues at block 602. This can be written in the following notation: R=[A:200; B:150, 150; C:250, 250].

Example B

Input: Routers R include routers A-G having the respective C's: [A:800; B:200; C:200; D:100; E:100; F:50; G:50]

$N=4$

At block 404 IW is determined using Equation (1). Total C for all R=[800+200+200+100+100+50+50]=1500

$IW=1500/4=375$

Iteration 1: After a first iteration of block 406 and 408:
R=[A:400, 400; B:200; C:200; D:100; E:100; F:50; G:50], totaling eight chunks.

Since there are already a total of at least four chunks in the routers R, there is no need for a second Iteration 2.

With reference to FIG. 5, a method performed by the monitor device to assign the chunks to particular groups is described. Each group will then be delivered to an assigned respective data partition of the columnar database. At block 502, R is sorted in descending order as a function of C for each router r divided by the number of chunks for r. At block 504, a determination is made whether there are more routers to process. If it is determined at block 504 that there are no more routers r to process, the method ends, else the method continues at block 506. At block 506, a (next) router r is selected based on the order. At block 508, a determination is made whether there are more chunks to process for the selected router r. If it is determined at block 508 that there are no more chunks to process for the selected router r, the method continues at block 504, else the method continues at block 510. At block 510, the chunk being processed for the selected router r is assigned to the group having the lowest statistic about flow of network traffic metadata that also does not already contain a chunk from the selected router r.

Continuing Example A, an example assignment of chunks from Example A to groups that correspond respectively to data partitions A-E is shown. The assignment is determined by performing block 502 of FIG. 5 to sort routers A, B, C as follows: R=[C:250, 250; B:150, 150; A:200].

The assignments of chunks to the groups for partitions (P) A-E are as follows:

$P=[PA:C:250;PB:C:250;PC:A:200;PD:B:150;PE:B: 150]$

Continuing Example B, R is sorted as follow: R=[[A:400, 400]; [B:200]; [C:200]; [D:100]; [E:100]; [F:50]; [G:50]]. Successive iterations of blocks 604-610 provide the following results:

$P=[PA:A:400];[PB:A:400];[PC:B:200];[PD:C:200]]$ $P=[PA:A:400];[PB:A:400];[PC:B:200,D:100];[PD:C: 200]]$ $P=[PA:A:400];[PB:A:400];[PC:B:200,D:100];[PD:C: 200,E:100]]$ $P=[PA:A:400];[PB:A:400];[PC:B:200,D:100,F:50]; [PD:C:200,E:100]]$ $P=[PA:A:400];[PB:A:400];[PC:B:200,D:100,F:50]; [PD:C:200,E:100,F:50]]$

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of the disclosure include software algorithms, programs, or code that can reside on a computer useable medium having control logic for enabling execution on a machine having a computer processor. The machine typically includes memory storage configured to provide output from execution of the computer algorithm or program.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments processing performed by the monitor device 102 may be implemented or executed by one or more computer systems. For example, processing performed by monitor device 102 can be implemented using a computer system such as example computer system 600 illustrated in FIG. 6. In various embodiments, computer system 600 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 600 is only one example of a suitable system and is not intended to suggest any limitation as to the scope of use or functionality of embodiments of the disclosure described herein. Regardless, computer system 600 is capable of being implemented and/or performing any of the functionality set forth hereinabove.

Computer system 600 may be described in the general context of computer system-executable instructions, such as program modules, being executed by a computer system. Generally, program modules may include routines, programs, objects, components, logic, data structures, and so on that perform particular tasks or implement particular abstract data types. Computer system 600 may be practiced in distributed data processing environments where tasks are performed by remote processing devices that are linked through a communications network. In a distributed data processing environment, program modules may be located in both local and remote computer system storage media including memory storage devices.

Figure 6:
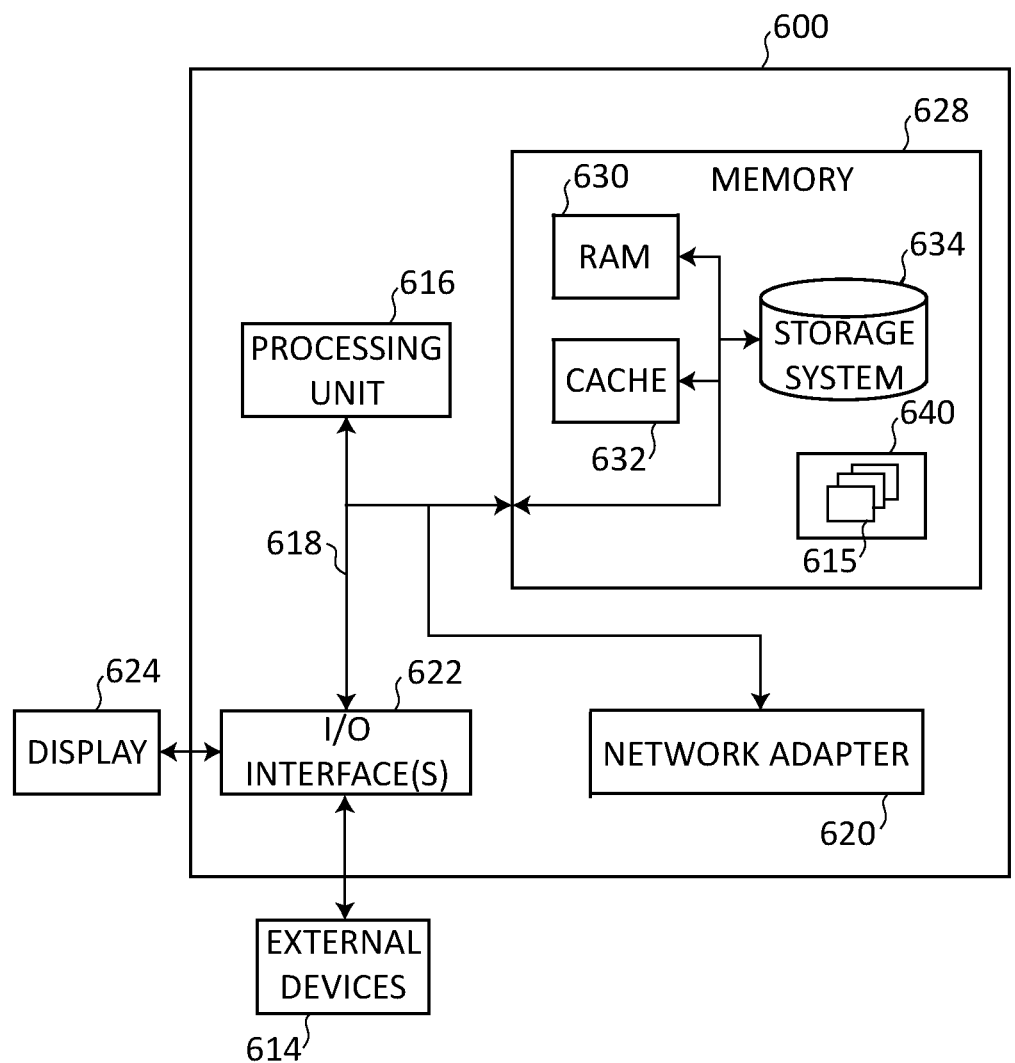
FIG. 6 is a block diagram of a computer system for implementing the disclosed methods, in accordance with embodiments of the disclosure.

Computer system 600 is shown in FIG. 6 in the form of a general-purpose computing device. The components of computer system 600 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 600 typically includes a variety of computer system readable media. Such media may be any available media that is accessible by the monitor device 102, and it includes both volatile and non-volatile media, removable and non-removable media.

System memory 628 can include computer system readable media in the form of volatile memory, such as random access memory (RAM) 630 and/or cache memory 632. Computer system 600 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the disclosure.

Program/utility 640, having a set (at least one) of program modules 615 may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 615 generally carry out the functions and/or methodologies of embodiments of the disclosure as described herein.

Computer system 600 may also communicate with one or more external devices 614 such as a keyboard, a pointing device, a display 624, etc.; one or more devices that enable a user to interact with computer system 600; and/or any devices (e.g., network card, modem, etc.) that enable the monitor device 102 to communicate with one or more other computing devices. Such communication can occur via Input/Output (I/O) interfaces 622. Still yet, computer system 600 can communicate with one or more networks such as a local area network (LAN), a general wide area network (WAN), and/or a public network (e.g., the Internet) via network adapter 620. As depicted, network adapter 620 communicates with the components of the monitor device 102 via bus 618. It should be understood that although not shown, other hardware and/or software components could be used in conjunction with computer system 600. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The techniques described herein are exemplary and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A computer-implemented method of grouping network traffic metadata, the method comprising:
    based on a selected dimension of the network traffic metadata received from at least one network router, obtaining a statistic about a flow of network traffic metadata received over an interval for each instance of the selected dimension over a property range;

distributing the network traffic metadata into a plurality of groups for network traffic metadata from the smallest possible number of instances of the selected dimension to be distributed to each group, with the flow of network traffic metadata distributed optimally for a criteria regarding the statistic amongst the plurality of groups for minimizing cardinality of each group of the plurality of groups with respect to unselected dimensions of the network traffic metadata;

providing each group to a columnar database for storage of the network traffic metadata distributed into each group in a different partition of the columnar database;

determining an ideal weight as a function of a sum of the statistic about flow of network traffic metadata for all of the instances of the selected dimension and a number of groups included in the plurality of groups;

splitting each router into equally sized chunks, wherein the number of chunks is a function of the statistic for the router and the ideal weight;

iteratively repeating until a total number of chunks for all of the instances of the selected dimension exceeds the number of groups; and splitting the router having the largest size chunk or chunks into its current number of chunks incremented by one.

2. The computer-implemented method claim 1, wherein the network traffic metadata is annotated before distributing into the determined number of groups.

3. The computer-implemented method claim 1, wherein providing each group to the columnar database includes providing the network traffic metadata flowing in real time to a forwarding component that provides each group to the columnar database.

4. The computer-implemented method of claim 1, wherein the selected dimension is a particular router that outputs the network traffic metadata.

5. The computer-implemented method of claim 4, wherein an amount of routers of the plurality of routers from which the network traffic metadata is received is flexible and an amount of the partitions to which the groups are provided is flexible.

6. The computer-implemented method of claim 1, wherein network traffic metadata from one instance of the selected dimension is distributed into at least two groups of the plurality of groups, wherein the method further comprises:

for the instance of the selected dimension, based on a second selected dimension of the network traffic metadata received from at least one network router, obtaining a second statistic about flow of network traffic metadata received over the interval for each instance of the second selected dimension that occurred with the instance of the selected dimension; and distributing the network traffic metadata into the plurality of groups for network traffic metadata from the smallest possible number of instances of the second selected dimension to be distributed to each of the at least two groups, with the flow of network traffic metadata distributed optimally for a criteria regarding the statistic amongst the at least two groups for minimizing cardinality of each group of the at least two groups with respect to unselected dimensions of the network traffic metadata.

7. The computer-implemented method of claim 1, wherein distributing the network traffic metadata is repeated at regular intervals and/or in response to an event or a condition.

8. The computer-implemented method of claim 1, wherein the criteria for optimally distributing the network traffic metadata over the at least two groups is optimization of even distribution of an amount of network traffic metadata that is distributed to the at least two groups.

9. The computer-implemented method of claim 1, further comprising:

sorting the instance of the selected dimension into an ascending or descending order as a function of the statistic about flow of network traffic metadata for the instance of the selected dimension divided by the number of chunks into which it was split;

iteratively repeating processing each of the instances of the selected dimension in the order of the sorting;

iteratively repeating for each chunk of the instance of the selected dimension being processed; and assigning a chunk of the instance of the selected dimension being processed to a group of the plurality of groups that has a least statistic about flow of network traffic metadata already assigned and does not already contain a chunk from the instance of the selected dimension being processed.

10. A computer-implemented method of grouping network traffic metadata, the method comprising:

receiving network traffic metadata from a plurality of network routers;

obtaining a statistic about flow of network traffic metadata received for a property range per router of the plurality of routers;

distributing the network traffic metadata into a plurality of groups in order for network traffic metadata from the smallest possible number of routers to be distributed to each group, with the statistic about flow of network traffic metadata distributed optimally for a criteria regarding the statistic amongst the plurality of groups for minimizing cardinality of each group of the plurality of groups with respect to different dimensions of the network traffic metadata;

providing each group to a columnar database for storage of the network traffic metadata distributed into each group in a different partition of the columnar database;

determining an ideal weight as a function of a sum of the statistic about flow of network traffic metadata for all of the instances of a selected dimension and a number of groups included in the plurality of groups;

splitting each router into equally sized chunks, wherein the number of chunks is a function of the statistic for the router and the ideal weight;

iteratively repeating until a total number of chunks for all of the instances of the selected dimension exceeds the number of groups; and splitting the router having the largest size chunk or chunks into its current number of chunks incremented by one.

11. A system of grouping network traffic metadata, the system comprising:

a memory configured to store a plurality of programmable instructions; and least one processing device in communication with the memory, wherein the at least one processing device, upon execution of the plurality of programmable instructions is configures to:

based on a selected dimension of the network traffic metadata received from at least one network router, obtaining a statistic about a flow of network traffic metadata received over an interval for each instance of the selected dimension over a property range;

distributing the network traffic metadata into a plurality of groups for network traffic metadata from the smallest possible number of instances of the selected dimension to be distributed to each group, with the flow of network traffic metadata distributed optimally for a criteria regarding the statistic amongst the plurality of groups for minimizing cardinality of each group of the plurality of groups with respect to unselected dimensions of the network traffic metadata; and providing each group to a columnar database for storage of the network traffic metadata distributed into each group in a different partition of the columnar database;

determining an ideal weight as a function of a sum of the statistic about flow of network traffic metadata for all of the instances of the selected dimension and a number of groups included in the plurality of groups;

splitting each router into equally sized chunks, wherein the number of chunks is a function of the statistic for the router and the ideal weight;

iteratively repeating until a total number of chunks for all of the instances of the selected dimension exceeds the number of groups; and splitting the router having the largest size chunk or chunks into its current number of chunks incremented by one.

12. The system of claim 11, wherein the network traffic metadata is annotated before distributing into the determined number of groups.

13. The system of claim 11, wherein providing each group to the columnar database includes providing the network traffic metadata flowing in real time to a forwarding component that provides each group to the columnar database.

14. The system of claim 11, wherein the selected dimension is a particular router that outputs the network traffic metadata.

15. The system of claim 14, wherein an amount of routers of the plurality of routers from which the network traffic metadata is received is flexible and an amount of the partitions to which the groups are provided is flexible.

16. The system of claim 11, wherein network traffic metadata from one instance of the selected dimension is distributed into at least two groups of the plurality of groups, wherein the at least one processing device, upon execution of the plurality of programmable instructions is configured to:

for the instance of the selected dimension, based on a second selected dimension of the network traffic metadata received from at least one network router, obtain a second statistic about flow of network traffic metadata received over the interval for each instance of the second selected dimension that occurred with the instance of the selected dimension; and distribute the network traffic metadata into the plurality of groups for network traffic metadata from the smallest possible number of instances of the second selected dimension to be distributed to each of the at least two groups, with the flow of network traffic metadata distributed optimally for a criteria regarding the statistic amongst the at least two groups for minimizing cardinality of each group of the at least two groups with respect to unselected dimensions of the network traffic metadata.

17. The system of claim 11, wherein the criteria for optimally distributing the network traffic metadata over the at least two groups optimization of even distribution of an amount of network traffic metadata that is distributed to the at least two groups.

18. The system of claim 11, wherein the at least one processing device, upon execution of the plurality of programmable instructions is configured to:

sort the instance of the selected dimension into an ascending or descending order as a function of the statistic about flow of network traffic metadata for the instance of the selected dimension divided by the number of chunks into which it was split;

iteratively repeat processing each of the instances of the selected dimension in the order of the sorting:

iteratively repeat for each chunk of the instance of the selected dimension being processed; and assign a chunk of the instance of the selected dimension being processed to a group of the plurality of groups that has a least statistic about flow of network traffic metadata already assigned and does not already contain a chunk from the instance of the selected dimension being processed.

* * * * *